United States Patent
Wiencke et al.

(10) Patent No.: US 11,934,245 B2
(45) Date of Patent: Mar. 19, 2024

(54) MICROCONTROLLER ENERGY PROFILER

(71) Applicant: Cypress Semiconductor Corporation, San Jose, CA (US)

(72) Inventors: Christian Wiencke, Campbell, CA (US); Hans Van Antwerpen, Mountain View, CA (US); Stephan Rosner, Campbell, CA (US); Roland Richter, Puchheim (DE); Jean-Paul Vanitegem, San Jose, CA (US); Jan-Willem Van de Waerdt, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/317,528

(22) Filed: May 11, 2021

(65) Prior Publication Data

US 2021/0373634 A1 Dec. 2, 2021

Related U.S. Application Data

(63) Continuation of application No. 15/585,890, filed on May 3, 2017, now Pat. No. 11,023,025.

(Continued)

(51) Int. Cl.
*G06F 1/28* (2006.01)
*G06F 1/3206* (2019.01)
(Continued)

(52) U.S. Cl.
CPC .............. *G06F 1/28* (2013.01); *G06F 1/3206* (2013.01); *G06F 1/3253* (2013.01);
(Continued)

(58) Field of Classification Search
CPC ........ G06F 1/28; G06F 1/3206; G06F 1/3253; G06F 11/3062; G06F 13/4282;
(Continued)

(56) References Cited

U.S. PATENT DOCUMENTS 6,021,381 A * 2/2000 Ohnishi .................. G06F 30/33
714/811
11,023,025 B2 * 6/2021 Wiencke ............... G06F 11/349
(Continued)

FOREIGN PATENT DOCUMENTS

CN 101192188 A 6/2008
CN 102576244 A 7/2012

OTHER PUBLICATIONS

Chinese Office Action for Application No. 201780057313.2 dated Sep. 16, 2022; 7 pages.

*Primary Examiner* — Faisal M Zaman

(57) ABSTRACT

A method is disclosed to estimate energy consumed by a component in a microcontroller during operation including identifying "event" activities, where the energy consumed by the component may be determined by the number of events executed by the component, and "duration" activities, where the energy consumed may be determined by the duration of time required to execute of the activity, and determining the energy consumed by the component based on the number of events/duration of time and an energy coefficient which corresponds to the amount of energy consumed by the component to execute the activity, under given operating conditions. In an embodiment, data transfers at a bus interface may represent event activities. Apparatus to estimate the energy consumed is disclosed including bus monitors to receive signals representing data transfers at a bus interface and provide signals indicating the number of data transfers executed.

23 Claims, 12 Drawing Sheets

Related U.S. Application Data

(60) Provisional application No. 62/422,739, filed on Nov. 16, 2016.

(51) Int. Cl.
*G06F 1/3234* (2019.01)
*G06F 11/30* (2006.01)
*G06F 13/42* (2006.01)

(52) U.S. Cl.
CPC ...... *G06F 11/3062* (2013.01); *G06F 13/4282* (2013.01); *Y02D 10/00* (2018.01)

(58) Field of Classification Search
CPC ............. G06F 2201/88; G06F 11/3024; G06F 11/3027; G06F 11/349; Y02D 10/00
See application file for complete search history.

(56) References Cited

U.S. PATENT DOCUMENTS

| | | | |
|---|---|---|---|
| 2003/0231542 A1* | 12/2003 | Zaharinova-Papazova | G11C 11/4076 365/236 |
| 2005/0046400 A1* | 3/2005 | Rotem | G06F 1/3203 323/234 |
| 2006/0265485 A1* | 11/2006 | Chai | G06F 9/3455 709/223 |
| 2007/0005995 A1* | 1/2007 | Kardach | G06F 1/325 713/300 |
| 2008/0243276 A1* | 10/2008 | Small | G06F 9/4881 700/90 |
| 2009/0287433 A1* | 11/2009 | Houston | G01R 21/133 702/62 |
| 2011/0055836 A1 | 3/2011 | Raghavan et al. | |
| 2011/0258420 A1* | 10/2011 | Devadas | G06F 9/3851 712/225 |
| 2012/0109550 A1* | 5/2012 | Naffziger | G01R 31/31721 702/61 |
| 2012/0249230 A1* | 10/2012 | Sugiyama | G06F 30/33 327/564 |
| 2013/0238266 A1* | 9/2013 | Savvides | G06Q 50/06 702/61 |
| 2013/0318382 A1* | 11/2013 | Yoshihara | G06F 1/3287 713/323 |
| 2013/0339762 A1* | 12/2013 | Bose | G06F 11/00 713/300 |
| 2014/0215241 A1 | 7/2014 | Yoon et al. | |
| 2014/0215248 A1* | 7/2014 | Cheng | G06F 1/3234 713/323 |
| 2014/0278165 A1* | 9/2014 | Wenzel | G06Q 50/08 702/183 |
| 2015/0040136 A1* | 2/2015 | Matthes | G06F 9/5094 718/104 |
| 2015/0069857 A1* | 3/2015 | Diewald | H01H 47/00 324/427 |
| 2015/0220672 A1* | 8/2015 | Park | G06F 30/33 703/2 |
| 2015/0355942 A1* | 12/2015 | Colin | G06F 1/3293 718/103 |
| 2017/0060633 A1* | 3/2017 | Suarez Gracia | G06F 11/3433 |
| 2017/0205864 A1* | 7/2017 | Singleton | G06F 1/12 |
| 2017/0344091 A1* | 11/2017 | Ting | G06F 1/3243 |

* cited by examiner

Equation 1: $E_{event}$ = event_coefficent x nbr_of_events

Equation 2: $E_{duration}$ = duration_coefficient x time_active
    time_active = per_ref x nbr_of_ref_cycles
    per_ref = period of the reference clock
    nbr_of_ref_cycles = number of reference clock cycles where component is active Equation 3: $E_{event}$ = event_coefficent x nbr_of_events$^2$

FIGURE 2

| Component | | Type | enabled |
|---|---|---|---|
| CPU activities | CPU | event | hardware |
| Flash activities | Flash read | event | hardware |
| | Flash write | event | software |
| | Flash erase | event | software |
| Peripheral activities | analog blocks (e.g., analog comparators, DACs) | duration | software |
| | General purpose I/Os (1) | duration | software |
| | General purpose I/Os (2) | duration | hardware |
| | Communications blocks (e.g., USB, BLE, I2C, SPI) | event | hardware |
| | Data processing blocks (e.g., DMA controller, graphics block) | event | hardware |

FIGURE 4

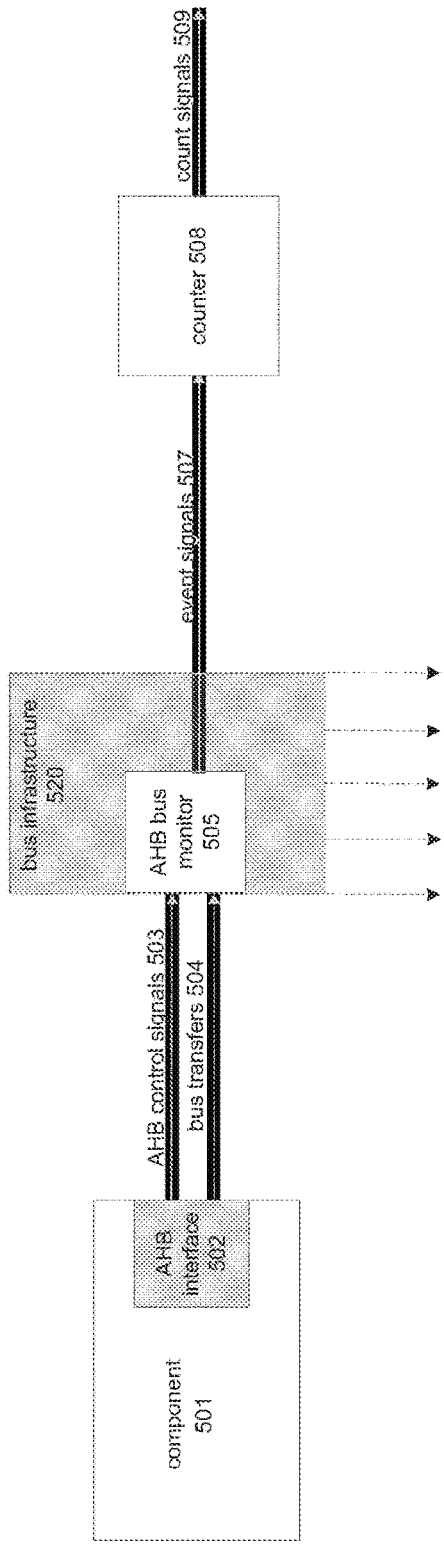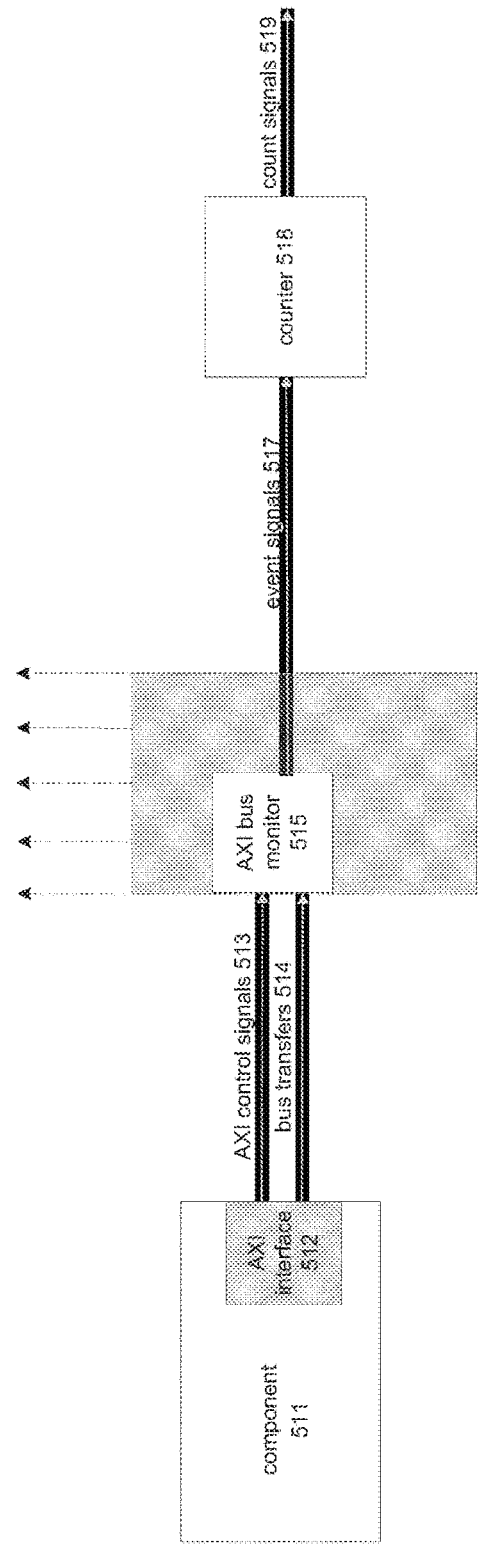

| power mode | duration measurement |
|---|---|
| Active/sleep/Low power active/low power sleep | software counts time using internal counters or clocks |
| off | software reads RTC before going into and after waking up from off mode<br>*Only possible if backup power domain with RTC is available* |
| hibernate | software reads RTC before going to and after waking up from hibernate mode<br>*Only possible if backup power domain with RTC is available* |
| deep sleep | software counts total time using RTC; software calculates deep sleep by subtracting time spent in hibernate, active, sleep, low power active, and low power sleep from total time |

FIGURE 7

MICROCONTROLLER ENERGY PROFILER

RELATED APPLICATIONS

This patent application is a Continuation of U.S. patent application Ser. No. 15/585,890, filed May 3, 2017, which claims the benefit of U.S. Provisional Patent Application No. 62/422,739, filed Nov. 16, 2016, all of which are incorporated by reference herein in their entirety.

TECHNICAL FIELD

The present disclosure relates generally to microcontrollers, and more particularly to determining the energy consumption of components of a microcontroller.

BACKGROUND

Managing the energy consumption of a microcontroller may be critical in some applications. In battery-powered applications, for example, it is important to minimize energy consumption in order to maximize battery life. In applications where the microcontroller is in an environment with limited heat dissipation, it is important to minimize the heat generated by the microcontroller to prevent overheating and malfunction of the microcontroller.

One current approach to managing energy consumption of a microcontroller involves adjusting operational settings, such as reducing clock speeds or disabling components during operation. However, without an accurate estimation of the energy consumption used by specific components during operation, such an approach may unnecessarily reduce functionality. Accordingly, a need has arisen for a method and corresponding apparatus for estimating the energy consumption used by specific components during operation in a microcontroller.

SUMMARY

In an embodiment, a method is disclosed to estimate the energy consumed by a component in a microcontroller during operation. The method includes identifying type of activity executed by the component as either an "event activity", where the energy consumed by the component may be determined by the number of events executed by the component, or as a "duration activity", where the energy consumed may be determined by the duration of time required to execute the activity (i.e., the duration of time the component is active); determining the number of events executed by the component or the duration of time that a component is active; and determining the energy consumed by the component based on the number of events/duration of time and an energy coefficient which corresponds to the amount of energy consumed by the component to execute an activity, under given operating conditions. The energy coefficient may be predetermined by the user. The method may be used during runtime operation in order to estimate battery lifetime or to dynamically adjust operation for power and energy consumption management. The method may be used during a debug session to estimate the amount of energy consumed by specific components in order to determine the energy coefficients or to fine-tune the application software to manage power and energy consumption during operation.

In an embodiment, an energy estimating circuitry is disclosed to implement the method described above including, but not limited to counters, clocks, analog circuitry, logic circuitry, and memory circuitry, configured to receive signals indicating event or duration activities of a component to be monitored, to estimate the energy consumed by the component to execute the activities, to provide signals indicating the energy consumed by the component, and to store a measurement of energy consumed by the component.

In an embodiment, a method is disclosed in which data transfers at a bus interface of a component may represent event activities executed by the component.

In an embodiment, a bus monitor is disclosed which may capture data transfers and data transfer control signals at a bus interface and may provide signals to indicate data transfers as events.

In an embodiment, an energy profiler unit is disclosed which may include various counter circuits, control registers, analog circuitry, and logic circuitry that measure a count of events or a duration of component active times.

BRIEF DESCRIPTION OF THE DRAWINGS

FIG. 2 illustrates equations to estimate energy usage according to various embodiments.

FIG. 4 illustrates a table disclosing methods to enable counting of component events or duration according to various embodiments.

FIG. 5A-B illustrates block diagrams of components configured to enable counting of bus accesses using bus monitors according to various embodiments.

FIG. 7 illustrates a table disclosing methods to enable duration measurement in various power modes embodiment according to various embodiments.

DETAILED DESCRIPTION

Figure 1:
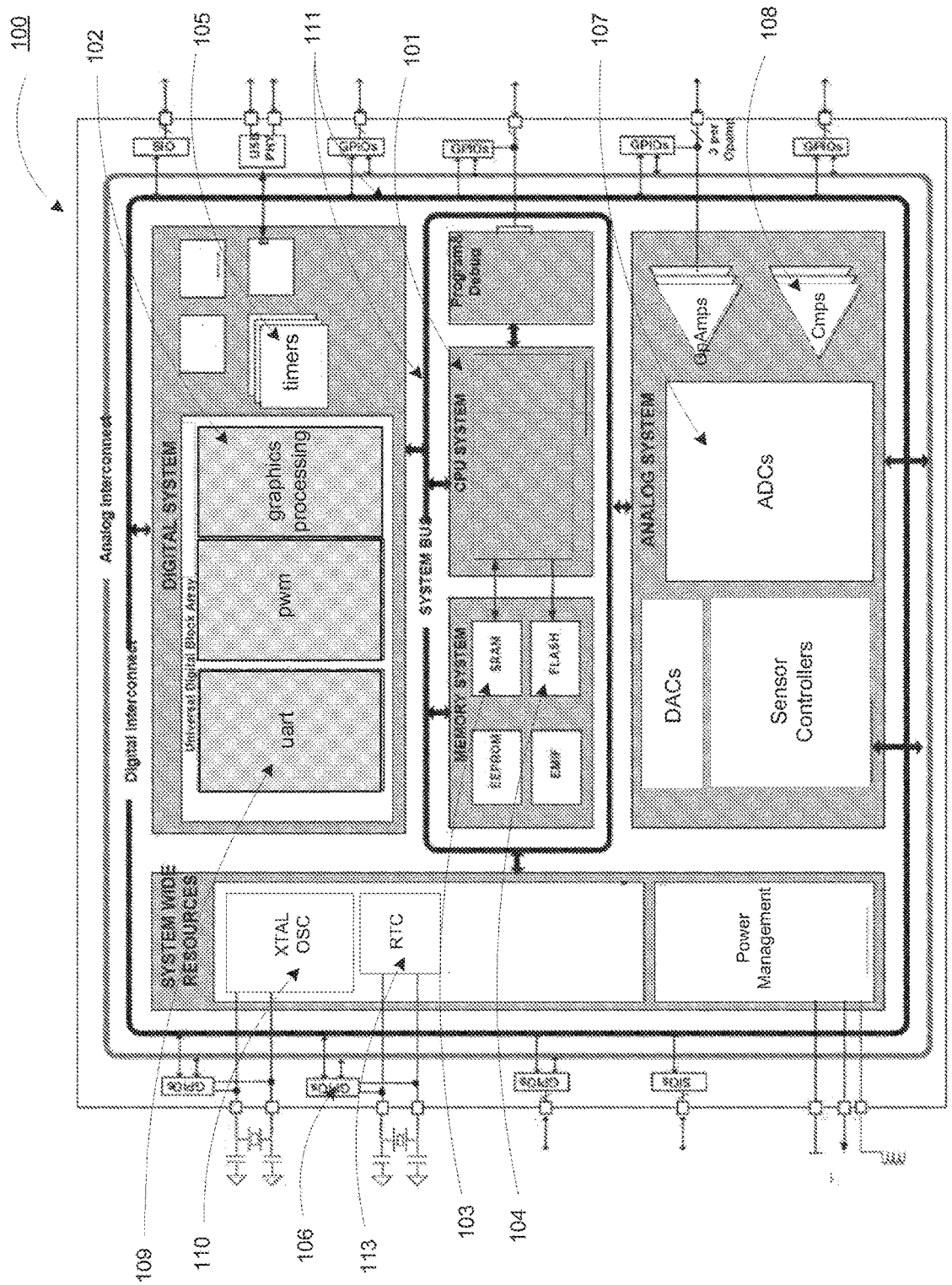
FIG. 1 illustrates a microcontroller according to an example embodiment.

In the following description, for purposes of explanation, numerous specific details are set forth in order to provide a thorough understanding of the embodiments of the present invention discussed herein. It will be evident, however, to one skilled in the art that these and other embodiments may be practiced without these specific details. In other instances, well-known circuits, structures, and techniques are not shown in detail, but rather in a block diagram in order to avoid unnecessarily obscuring an understanding of this description. Thus, the specific details set forth hereinafter are merely exemplary. Particular implementations may vary from these exemplary details and still be contemplated to be within the spirit and scope of the present invention.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

The description includes references to the accompanying drawings, which form a part of the detailed description. The drawings show illustrations in accordance with exemplary embodiments. These embodiments, which may also be referred to herein as "examples", are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

For simplicity and clarity of illustration, reference numerals may be repeated among the figures to indicate corresponding or analogous elements. Numerous details are set forth to provide an understanding of the embodiments described herein. The examples may be practiced without these details. In other instances, well-known methods, procedures, and components are not described in detail to avoid obscuring the examples described. The description is not to be considered as limited to the scope of the examples described herein.

OVERVIEW

FIG. 1 illustrates a microcontroller 100 according to various embodiments. Microcontrollers may have many components integrated into a single integrated circuit (IC) device. Components may include central processing units ("CPU") 101, graphics processing units 102, memories such as SRAM 103 and Flash 104, digital components such as timers 105 and input/outputs ("I/Os") 106, analog components such as analog-to-digital converters ("ADC") 107 and analog comparators 108, communication interfaces 109, clock sources such as a crystal oscillator 110, timers such as a real time clock ("RTC") 113, and internal busses 111. It is noted that various implementations and embodiments may use different components or combinations of components to perform the operations of the circuitry in FIG. 1. Thus the description that follows and the circuitry in FIG. 1 is to be regarded in an illustrative rather than a restrictive sense.

In some applications, microcontrollers may operate using battery power, which requires management of the energy consumption of the microcontroller to maximize battery life. In other applications, microcontrollers operate in environments with limited heat dissipation, which requires management of the power consumption of the microcontroller to minimize the heat generated by the microcontroller to prevent overheating and malfunction of the microcontroller.

The power consumption of a microcontroller may be a function of the power consumed by the microcontroller components while they execute activities (or are "active"). In an example, each instance that a microcontroller executes a flash read access, power is consumed by the flash memory. In this example, the amount of energy consumed by the flash memory may be proportional to the number of flash read accesses (i.e., "events") executed. In another example, each instance that an analog comparator is performing a comparison, power is consumed by the analog comparator. In this example, the amount of energy consumed by the analog comparator may be proportional to the amount of time (i.e., the "duration") that the analog comparator is active (i.e., executing the comparison).

The total amount of power consumed by a microcontroller at a specific point in time may be estimated by totaling the power used by the components that are active at that point in time. The total amount of energy consumed by a microcontroller during a period in time may be estimated by totaling the energy used by the components that are active during that period of time. Thus, the power consumption of the microcontroller may be estimated instantaneously or energy consumption may be estimated over a period of time. Estimated power consumption may be used to estimate peak power consumption by the microcontroller. Estimated energy consumption may be used to estimate battery lifetime.

FIG. 2 discloses three equations which may be used estimate energy consumed while components are active. The activities executed by a component may be event activities where the energy consumed by the component may be determined by the number of events executed. The activities executed by a component may be duration activities, where the energy consumed may be determined by the duration of time required to execute the activity (i.e., the duration of time the component is active). Equation 1 describes an estimation of a measure of event-type energy consumption. The energy consumed may be a function of, or based on, the number of events and the "event_coefficient", which represents, or corresponds to, an average amount of energy consumed per given event, under given operating conditions. Equation 2 describes the estimation of a measure of duration-type energy consumption. The energy consumed may be a function of, or based on, the duration of time and the "duration_coefficient", which represents, or corresponds to, an average amount of power consumed for a given duration activity, under given operating conditions.

The energy coefficient (i.e., the event_coefficient and the duration_coefficient in FIG. 2) may be predetermined by the user. Operating conditions may include power mode, supply voltage, operating frequency, and modes of operation. In an embodiment, a component may execute only event-type or only duration-type activities. In another embodiment, a component may execute both event-type activities and duration-type activities.

Equation 1 and Equation 2 of FIG. 2 illustrate examples where energy consumption may be a linear function of energy coefficient and events/duration. Equation 3 illustrates an example of event-type energy consumption where energy consumption may be a non-linear function of energy coefficient and events. It is to be understood that the relationship between energy coefficients and events/duration may be more complex than is illustrated here; thus, the equations of FIG. 2 are to be regarded in an illustrative sense rather than a restrictive sense.

Figure 3A:
FIGS. 3A-3D illustrate block diagrams of components configured to perform methods to enable counting of events or measurement of duration according to various embodiments.

FIGS. 3A-3D illustrate examples in which the event count or duration of activities may be calculated. In FIG. 3A, component 301 executes an event activity which may be under software control (i.e., an activity that may be completely enabled/disabled by firmware or software which may be stored in one or more memory components of the microcontroller including, but not limited to Flash, ROM, and RAM, and which may be executed by a component of the microcontroller including, but not limited to, a CPU). The software may count the events executed by component 301.

Figure 3B:
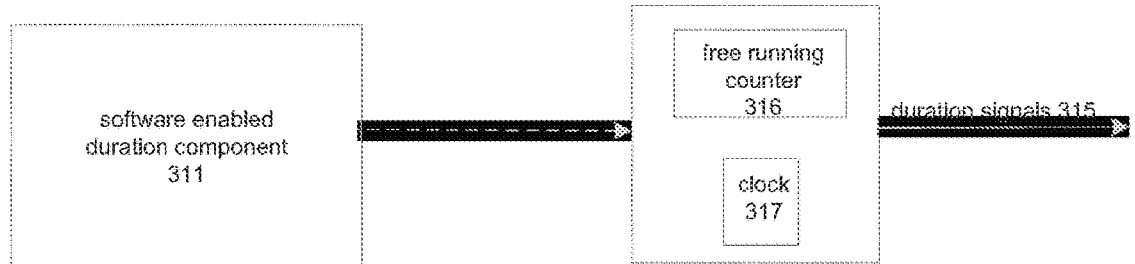

In FIG. 3B, component 311 executes a duration activity which may be under software control. In an embodiment, software may select free running counter 316 and may capture an initial value of free running counter 316 at the start of the activity and a final value at end of the activity. A duration count may be calculated by finding the difference between an initial value and a final value. Free running counter 316 may use as a reference clock 317. Clock 317 may have a known frequency at least as fast as the frequency of the activity (i.e., the frequency of the start/stop of the activity). In a specific embodiment, clock 317 may have a frequency at least twice as fast as the frequency of the activity to enable accurate counting of the duration activities. Free running counter 316 and clock 317 may be internal or external to component 321. Free running counter 316 may provide duration signals 315 corresponding to the initial count and final count.

Figure 3C:
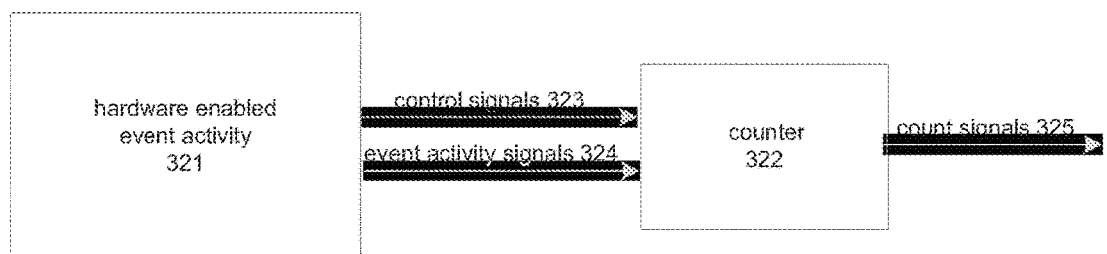

In FIG. 3C, component 321 executes an event activity under hardware control (i.e., enabled and/or disabled by hardware). Component 321 may use hardware circuitry including, but not limited to clocks, analog circuitry, and digital logic circuitry, to provide control signals 323 that may include, but are not limited to, counter enable/disable and counter increment signals, and may send event activity signals 324 to indicate each instance that an event occurs to be counted by counter 322. Counter 322 may be internal or external to component 321. Counter 322 may be controlled (e.g., enabled/disabled) by firmware or software. Counter 322 may provide count signals 325 corresponding to the number of events counted.

Figure 3D:
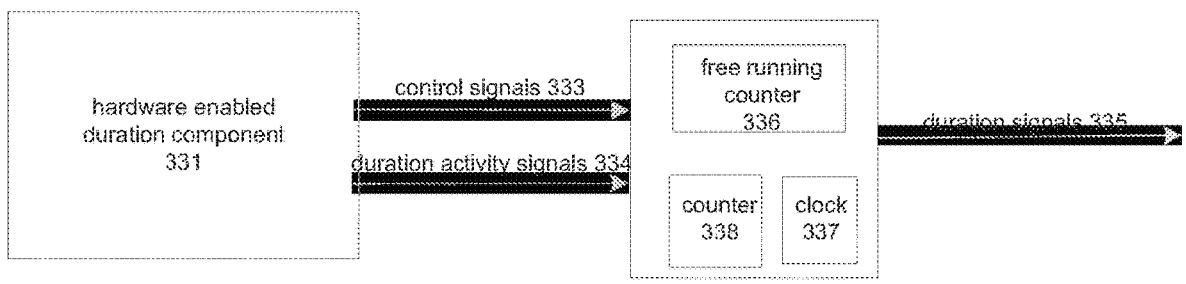

In FIG. 3D, component 331 may execute a duration activity under hardware control. In an embodiment, component 331 may provide control signals 333 and duration activity signals 334 to enable counter 338 to increment based on the edges of clock 337 while component 331 is active. Clock 337 may have a frequency at least as fast as the frequency of duration activity signals 338. In a specific embodiment, clock 337 may have a frequency twice as fast as the frequency of duration signals 338 to enable accurate counting of duration activities. Free running counter 336, clock 337, and counter 338 may be internal or external to component 331. Free running counter 336, clock 337, and counter 338 may provide duration signals 335 corresponding to the initial count, final count, or duration count. In another embodiment, component 331 may use hardware circuitry including, but not limited to clocks, analog circuitry, and digital logic circuitry to enable capturing an initial value of a free running counter 336 at the start of the activity and a final value at the end of the activity. Component 331 may provide duration activity signals 334 corresponding to the beginning of an activity and the end of an activity. For example, an A/D converter may provide a "start conversion" signal to enable capturing an initial count of a free running counter and a "conversion completed" signal to enable capturing a final count of free running counter. Free running counter 336 may use a reference clock 337 with a known frequency at least as fast as the frequency of the duration activity signals 334 (i.e., the frequency of the activity start/stop signal). In a specific embodiment, clock 337 may have a frequency at least twice as fast as the frequency of the activity to enable accurate counting of the duration activities. A duration count may be calculated by finding the difference between an initial count and a final count.

In examples of duration components such as illustrated in FIGS. 3B and 3D, the duration may be calculated by multiplying the duration count by the period of the clock 317, 337. The duration count and duration may be calculated by the component or by another component of the microcontroller, such as a CPU, or by an external system coupled to the microcontroller, such as a debug host.

In examples as illustrated in FIGS. 3A-3D, a measure of energy consumption associated with an event or duration activity may be estimated based on the count signals or duration signals and the corresponding energy coefficients by the component or by another component of the microcontroller, such as a CPU, or by an external system coupled to the microcontroller, such as a debug host.

In examples as illustrated in FIGS. 3A-3D, the event count, initial count, final count, duration count, duration, or measure of energy consumption may be stored by the component or by another component of the microcontroller, or by an external system coupled to the microcontroller in storage components including, but not limited to Flash, ROM, RAM, and other storage technology.

In an embodiment, energy estimating circuitry may comprise some or all of the elements illustrated in FIGS. 3A-3D. Energy estimating circuitry may further comprise circuitry or circuit blocks, including but not limited to a CPU, which may calculate duration and may estimate a measure of energy consumption according to the methods described above and disclosed in FIG. 2. Some or all components of energy estimating circuitry may be components of the microcontroller, or may be components of an external system coupled to the microcontroller.

FIG. 4 discloses examples of component activities whose energy consumption may be estimated using the disclosed invention, including CPU, memory, and peripheral component activities according to some embodiments. In an example, energy consumed by a serial peripheral interface ("SPI") may be estimated as an event activity under hardware control. In another example, energy consumed by a general purpose I/O may be estimated as a duration activity under software control. It is to be understood energy consumption by components may include energy consumption corresponding to both event and duration activities, which may be controlled by both software and hardware.

CPU Energy Estimation

As disclosed in FIG. 4, the energy consumed by a processing unit such as a CPU may be estimated using the methods disclosed above. In an embodiment, the energy consumed by a CPU may be estimated based on duration activity (i.e., based on a duration of time that a CPU is active). In another embodiment, the energy consumed by a CPU may be estimated based on event activity (e.g., instructions or active CPU cycles). The corresponding energy coefficients to estimate CPU energy consumption may be based on the activity executed, under given operating conditions.

Memory Access Energy Estimation

As disclosed in FIG. 4, the energy consumed by accesses to and from memory may be estimated as event activities using the methods disclosed above. In some embodiments, RAM and ROM accesses may be very small compared to CPU energy consumption. The energy consumption of RAM and ROM accesses may be included in an energy coefficient representing an amount of energy consumed by the CPU for a given activity, under given operating conditions. In other embodiments, the number of RAM or ROM accesses may be significant compared to the CPU energy consumption. Energy consumption of RAM and ROM accesses may be estimated as event activities with corresponding energy coefficients for each type of RAM or ROM access, under given operating conditions.

In some embodiments, the energy consumed by accesses to and from flash memory may be significant compared to the total CPU energy consumption. Energy consumption of flash accesses may be estimated as event activities with corresponding energy coefficients for each type of flash access (e.g., read, program, erase), under given operating conditions.

Peripheral Component Duration Activity Energy Estimation

As disclosed in FIG. 4, activities executed by microcontroller components may be duration activities. The energy consumed by a component to execute a duration activity may be calculated using the methods disclosed above. Components which execute duration activities may include analog components such as analog-to-digital ("A/D") converters, digital-to-analog converters ("DACs"), op-amps, and comparators. Components which execute duration activities may also include general purpose input/outputs ("GPIO"). In some embodiments, component duration activities may be under software control. In other embodiments, component duration activities may be under hardware control. A corresponding energy coefficient may correspond to an amount of power consumed for a given or representative duration for a given activity, under given operating conditions. In an example, the energy coefficient of a GPIO may depend on what may be connected externally to the GPIO.

In an embodiment, a component may use the duration and energy coefficients to estimate a measure of the energy consumed by the component. In another embodiment, another component of the microcontroller, such as the CPU, or an external system coupled to the microcontroller, such as a debug host, may estimate a measure of the energy consumed. A measure of energy consumption may be stored in one or more memory components of the microcontroller or of an external system coupled to the microcontroller.

Peripheral Component Event Activity Energy Estimation

As disclosed in FIG. 4, activities executed by microcontroller components may be event activities. The energy consumed by a component to execute an event activity may be calculated using the methods disclosed above. Components which execute event activities may include communications components such as I2C, SPI, UART, and USB components. Components which execute event activities may also include data processing components such as DMA controllers, graphics controllers, and crypto/authentication components. In an embodiment, an event activity may be a data transfer. In some embodiments, component event activities may be under software control. In other embodiments, component event activities may be under hardware control.

In some embodiments, a component may execute multiple successive ("back-to-back") event activities, which may be indicated by a signal which may be active for multiple clock signals. In an example, a data transfer enable may be active for two cycles, corresponding to two transfers corresponding to two events. In some embodiments, a counter may use the event source clock of the event activity as a reference clock, enabling accurate counting of single pulse events as well as 'back-to-back' event signals. In other embodiments, a counter may use as a reference clock a different clock than the event activity source clock. In this embodiment, the reference clock may be at least as fast as the event source clock. In a specific embodiment, the reference clock may be at least twice as fast as the event source clock to enable accurate counting. A signal may be configured by edge encoding using the reference clock, enabling accurate counting of back-to-back events without the use of the event source clock.

A corresponding energy coefficient may correspond to an average amount of energy consumed per event, under given operating conditions. In an example, the energy coefficient corresponding to a data transfer may depend on the amount of data transferred in each event.

In an embodiment, a component may use the event count and energy coefficients to estimate a measure of the energy consumed by the component. In another embodiment, another component of the microcontroller, such as a CPU, or an external system coupled to the microcontroller, such as a debug host, may estimate a measure of the energy consumed by the component. A measure of energy consumption may be stored in one or more memory components of the microcontroller or of an external system coupled to the microcontroller.

Representing Component Event Activities Using Data Transfers

In some embodiments, event activity energy consumption of components may be represented by the transfer of data to or from the component. The amount of energy consumed by the component may be related to the number of data transfers at a bus interface to or from the component. In an embodiment, the amount of energy consumed may be related to the amount of data transferred. In an example, event activities executed by a DMA controller may be represented by data transfers and the event count may be represented by a data transfer count or a byte count. Using data transfers to represent events may work for bus slaves as well as bus masters. A bus interface may be a set of hardware components which are a part of the structure of a component.

In an example, a component may use an Advanced High-Performance Bus ("AHB") interface. AHB is a bus structure within the microcontroller which connects subsystems (including, but not limited to, CPU subsystems, analog subsystems, digital subsystems, memory subsystems, clock subsystems, and I/O subsystems) and/or components (for example, analog-to-digital converters, Flash memory, sensor controllers, and real time clocks). An AHB interface may provide bus interface signals including, but not limited to, TRANS[1], HREADY, HSEL, HTRANS[1], HREADY, and HREADY_OUT. Bus accesses at an AHB interface to a component may represent event activities executed by the component. The AHB bus interface signals may be configured to signal a counter to count data transfers or bytes transferred at the AHB interface.

In an example, a component may use an Advanced eXtensible Interface ("AXI") bus interface. AXI is a bus structure within the microcontroller which connects subsystems and/or components. Bus accesses at an AXI interface to a component may represent event activities executed by the component. The AXI bus interface signals may be configured to signal a counter to count data transfers or bytes transferred at the AXI interface.

In an example, a component may use a bus interface which is compatible to busses used by Intel® processors such as Celeron®, Pentium®, and Core i3® processors. An x86-compatible bus interface may be compatible to busses including, but not limited to, a front side bus, a back side bus, a Direct Media Interface ("DMI"), and a QuickPath Interconnect ("QPI"). Bus accesses at an x86-compatible bus interface to a component may represent event activities executed by the component. The x86-compatible bus interface signals may be configured to signal a counter to count data transfers or bytes transferred at the x86-compatible interface.

Corresponding energy coefficients may correspond to an average amount of energy consumed per data transfer, under given operating conditions. In an example, the energy coefficient corresponding to a data transfer may depend on the bus interface or on the amount of data Monitoring Data Transfers Using a Bus Monitor FIGS. 5A-5B illustrates the use of a bus monitor coupled to a bus interface to facilitate counting data transfer events. In an embodiment, data transfers at a bus interface may be monitored by a bus monitor which may be coupled to the bus interface and to a counter. In a specific embodiment, a bus monitor may be a set of hardware components which may be part of a bus infrastructure of the microcontroller. A bus infrastructure may include, but is not be limited to, bus 111 as illustrated in FIG. 1. A bus monitor may be configured to receive control signals and data transfers from the corresponding bus interface protocol. Bus interface protocols may include, but are not limited to, AHB, AXI, and x86-compatible bus interface protocols. The bus monitor may receive the control signals and data transfers from the bus interface, and configure the received signals to provide signals corresponding to bus transfer events to be counted. In an example, the number of data transfers may be counted. In another example, the number of bytes transferred may be counted.

FIG. 5A illustrates component 501 completing data accesses via AHB interface 502 to bus infrastructure 520. Bus infrastructure 520 includes AHB bus monitor 505. AHB interface 502 provides AHB control signals 503 and bus transfers signals 504 to AHB bus monitor 505. AHB control signals 503 may include, but are not limited to, TRANS[1], HREADY, HSEL, HTRANS[1], and HREADY_OUT. AHB bus monitor 505 may configure AHB signals 503 and 504 to provide event signals 507 to counter 508 to be counted. Counter 508 provides count signals 509 corresponding to the count of bus transfers 504.

FIG. 5B illustrates component 511 completing data accesses via AXI interface 512 to bus infrastructure 520. Bus infrastructure 520 includes AXI bus monitor 515. AHB interface 512 provides AXI control signals 503 and bus transfers signals 514 to AXI bus monitor 515. AXI control signals 513 may include, but are not limited to, WVALID, WREADY, RVALID, and RREADY. AXI bus monitor 515 may configure AXI signals 513 and 514 to provide event signals 517 to counter 518 to be counted. Counter 518 provides event count signals 519 corresponding the count of bus transfers 514.

In an embodiment, a bus monitor may be configured for each corresponding bus interface. In an example, a universal AHB bus monitor may be instantiated for each corresponding AHB interface. In another example, a universal AXI bus monitor may be instantiated for each corresponding AXI interface. In another example, a universal x86-type bus monitor may be instantiated for each corresponding x86-type interface. Use of a bus monitor eliminates the need to modify a component or provide custom logic to provide appropriate signals for a counter to count transfers at a bus interface.

In some embodiments, a component may have more than one bus interface. A bus monitor corresponding to the bus interface type may be coupled to each bus interface.

Corresponding energy coefficients may represent, or correspond to, an average amount of energy consumed per data transfer, under given operating conditions. In an example, the energy coefficient corresponding to a data transfer may depend on the bus interface or on the amount of data transferred in each event.

Figure 6A:
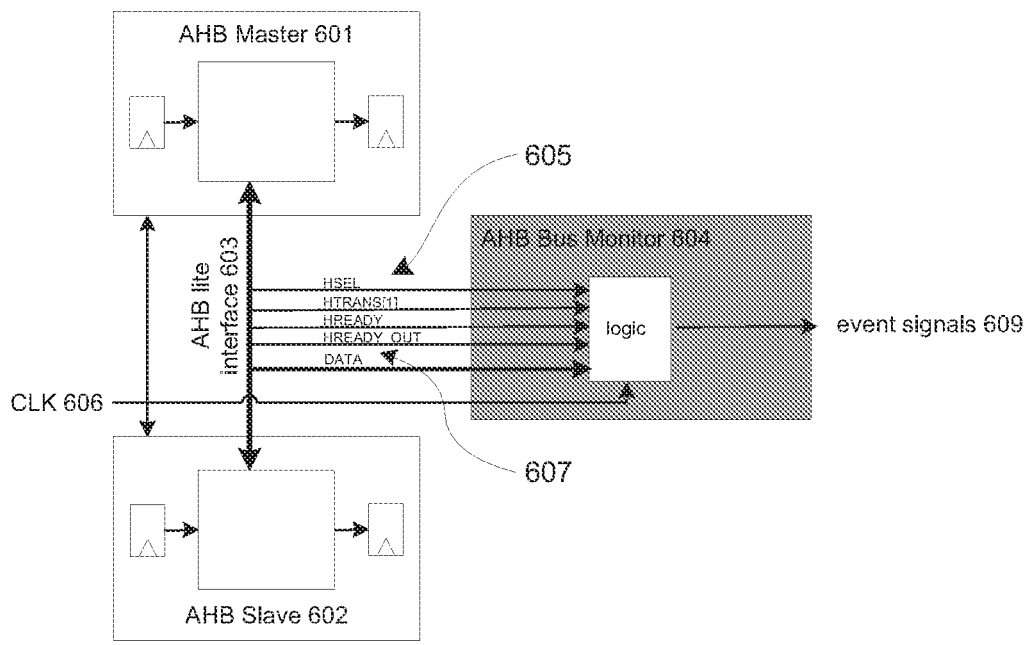
FIG. 6A-B illustrate bus monitors according to various embodiments.
Figure 6B:
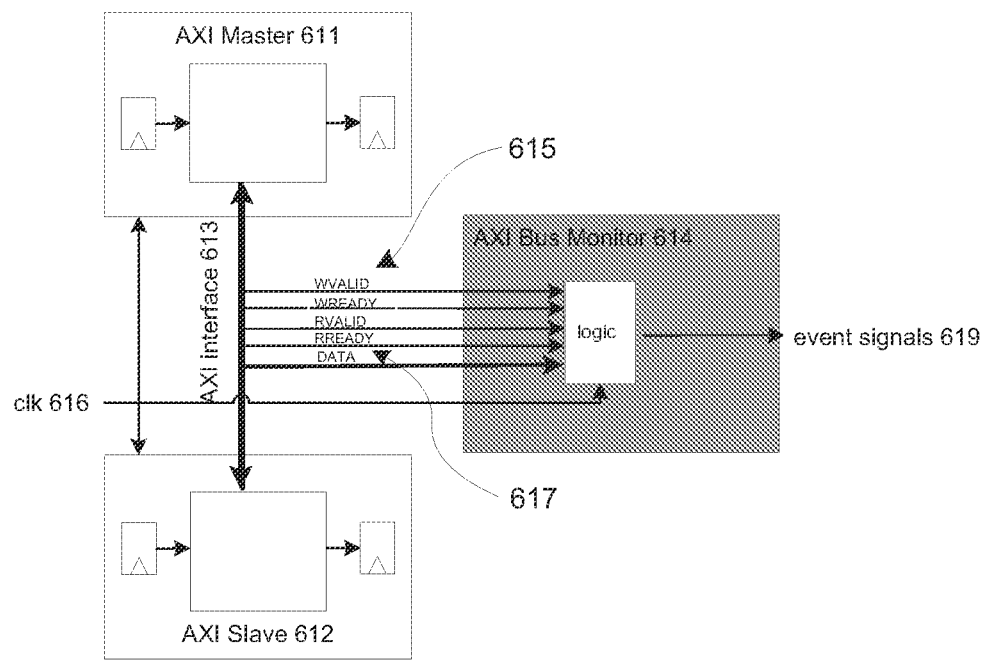

FIG. 6A illustrates an embodiment of a bus monitor block corresponding to an AHB bus interface and FIG. 6B illustrates an embodiment of a bus monitor block corresponding to an AXI bus interface, which may correspond to the bus monitors referenced above and in FIGS. 5A-5B. It is noted that various implementations and embodiments may use various, and possibly different, components to perform the operations of the method disclosed above. Thus, the description that follows and the circuitry in FIGS. 6A-B are to be regarded in an illustrative rather than a restrictive sense.

FIG. 6A illustrates AHB master 601 and AHB slave 602 configured to communicate and transfer date via AHB slave interface 603. AHB bus monitor 604 may be configured to receive AHB signals 605 including, but not limited to, HSEL, HTRANS[1], HREADY, and HREADY_OUT, DATA 607, and clock signal 606. AHB bus monitor 604 contains logic to configure AHB signals 605 and 607 to provide event signals 609.

FIG. 6B illustrates AXI master 611 and AXI slave 612 configured to communicate and transfer date via AXI interface 613. AXI bus monitor 614 may be configured to receive AXI control signals 615 including, but not limited to, WVALID, WREADY, RVALID, AND RREADY, DATA 617, and clock signal 616. AXI BUS monitor 614 contains logic to configure AXI signals 615 and 617 to provide event signals 619. In an embodiment, read and write accesses on an AXI interface are monitored together, for example, while monitoring an AXI DMA controller. In another embodiment, only AXI read or only AXI write accesses may be monitored; in this embodiment, the signals of the other channel may be tied to 0. In another embodiment, both AXI read or only AXI write accesses may be monitored separately; in this embodiment, two AXI monitor blocks may be used.

It is to be understood that other bus monitors may be configured to monitor activity on other bus interface types including, but not limited to, other configurations of AHB, AXI, and x86-type bus interfaces.

In an embodiment, energy estimating circuitry may comprise some or all of the elements illustrated in FIGS. 5A-5B including, but not limited to, bus interfaces 502, 512, bus monitors 505, 515, bus infrastructure 520, and counters 508, 518. In an embodiment, energy estimating circuitry may comprise some or all of the elements illustrated in FIGS. 6A-6B including, but not limited to, AHB bus monitor 604 and AXI bus monitor 614. Energy estimating circuitry may further comprise logic circuitry, including but not limited to a CPU, which may calculate event activity counts and to estimate energy consumption according to the methods described above and disclosed in FIG. 2.

Power Mode Estimation

The energy consumed by the microcontroller during low power modes may be estimated as a duration activity under software control, as described above. Power modes may comprise, but are not limited to, "active", "sleep", "deep sleep", "low power active", "low power sleep", "hibernate", or "off" modes.

FIG. 7 illustrates several example power modes and methods to measure duration in a power mode. In an embodiment, an active power mode may be a mode where a high frequency internal clock is available as a reference to a free running counter. An active power mode may include, but is not limited to, active, sleep, low power active, or low power sleep modes. A duration of time in a given active power mode may be measured using methods similar to the method described relative to FIG. 3B where an initial value of the free running counter corresponds to entering a given active power mode and a final value corresponds to exiting the given active power mode.

In an embodiment, an inactive power mode may be a mode where a high frequency internal clock is not available but a free running counter such as a real time clock ("RTC") is available. An inactive power mode may include, but is not limited to, off or hibernate modes. A duration of time spent in each inactive power mode may be measured using methods similar to the method described relative to FIG. 3B where an initial value of the RTC corresponds to entering a given inactive power mode and a final value corresponds to exiting the given inactive power mode. This method requires a free running counter or RTC that remains active while the microcontroller may be in an inactive power mode.

In another embodiment, a short duration inactive power mode may be an inactive power mode where a duration of time spent in the mode is shorter than the resolution of the free running counter or RTC. A short duration inactive mode may include, but not limited to, deep sleep mode. A duration of time spent in each short duration inactive power mode may be calculated by configuring the software to read the RTC to determine the total active time of the microcontroller, then subtracting the time spent in each of all of the other power modes (measured using the methods described above) from the total active time to yield the time spent in a short duration inactive power mode.

Corresponding energy coefficients may correspond to an average amount of energy consumed per duration in each power mode, under given operating conditions. The energy consumed in each power mode may be estimated as based on the duration of time spent in each power mode and the corresponding energy coefficient.

Energy Profiler Unit

Figure 8:
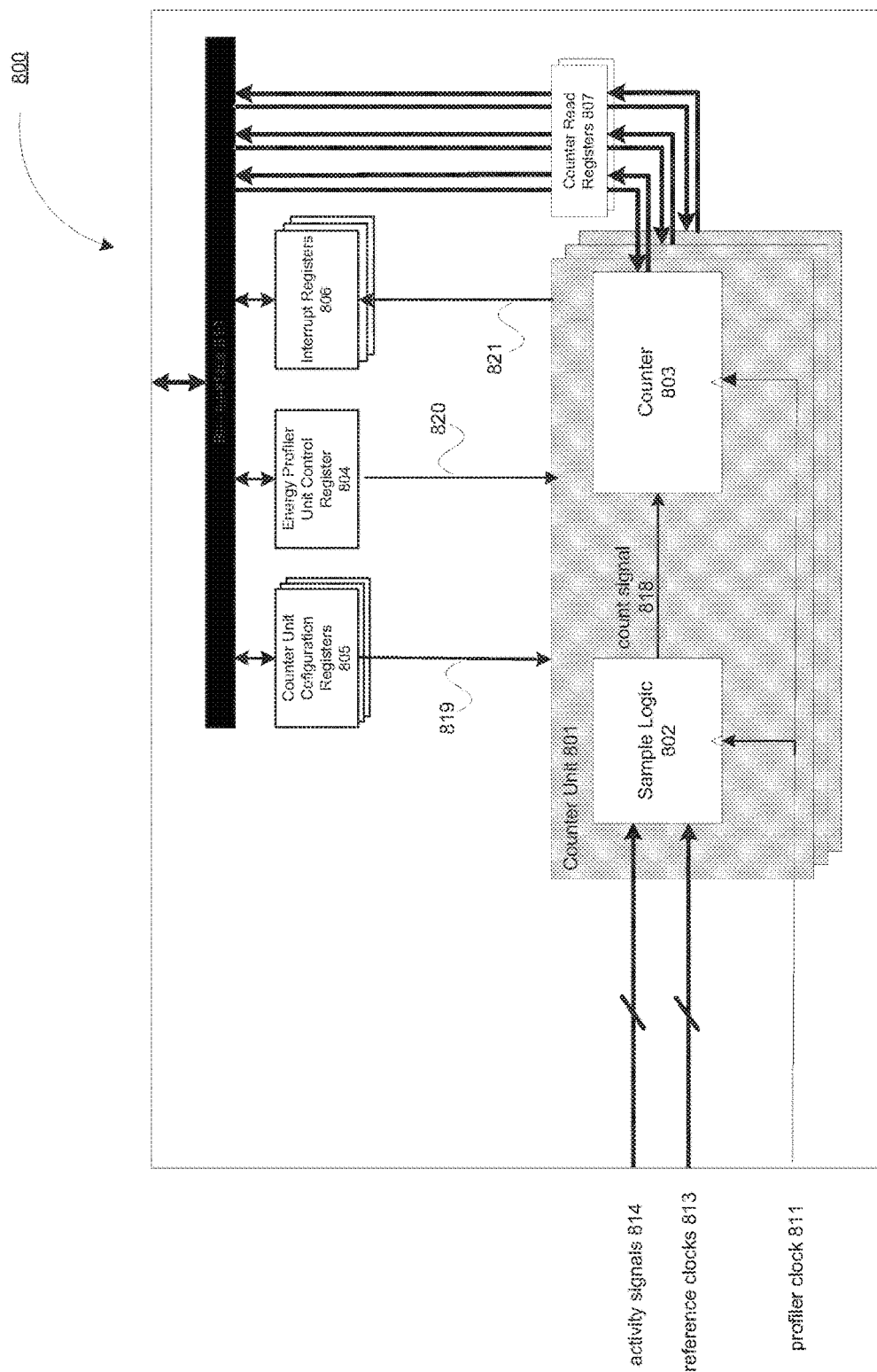
FIG. 8 illustrates an energy profiler unit according to an embodiment.

FIG. 8 illustrates an embodiment of energy profiler unit 800 which may be implemented in a microcontroller to measure event counts or duration according to the techniques disclosed above. Energy profiler unit 800 may comprise hardware components including, but not limited to, a plurality of counter units 801, energy profiler unit control register 804, counter unit configuration registers 805, interrupt registers 806, counter read registers 807, and bus interface 810. Each counter unit 801 may comprise sample logic 802 and counter 803. In an embodiment, an energy estimation circuitry may comprise an energy profiler unit. It is noted that various implementations and embodiments may use different components or combinations of components to perform the operations of the circuitry in FIG. 8. Thus the description that follows and the circuitry in FIG. 8 is to be regarded in an illustrative rather than a restrictive sense.

The number of counter units may be determined by design requirements. In an embodiment, the size of the counters may be chosen to be big enough to avoid overflows even for counting durations. In another embodiment, the size of the counters may be chosen to enable the counter to be read in one bus access. In a particular embodiment, the counters may be 32 bits.

In an embodiment, the counter units may be multiple instantiations of a first counter unit configuration. In another embodiment, the counter units may comprise counter units of different configurations.

Energy profiler unit 800 may use profiler clock 811 to clock the components of the energy profiler unit 800. In an embodiment, profiler clock 811 may be a high frequency clock such as an internal main oscillator clock. In an embodiment, profiler clock 811 may be used to clock a bus interface 810 in order to minimize the time required to read the counters. In particular embodiments, bus interface 810 may be an AHB, AXI, or x86-compatible interface. In an embodiment, a profiler clock 811 may be used to clock counter read registers 807 in order to facilitate moving counter data to bus interface 810.

Profiler clock 811 may be divided by the sample logic to generate a frequency that may be at least as high as the highest frequency of synchronous event to be counted, to ensure that all activity signals are captured. In an embodiment, profiler clock 811 may be divided by sample logic 802 to generate a frequency that may be at least as twice as high as the highest frequency of asynchronous events to be counted, to ensure that all activity signals are captured.

Energy profiler unit 800 may use one of a plurality of reference clocks 813. In an embodiment, energy profiler unit 800 may use one of a plurality of reference clocks 813 as a reference clock for duration activities or for counting events. In an embodiment counting events when not using edge encoding, reference clocks 813 may comprise event source clocks. In another embodiment, energy profiler unit 800 may use one of a plurality of event source clock enable signals.

Figure 9:
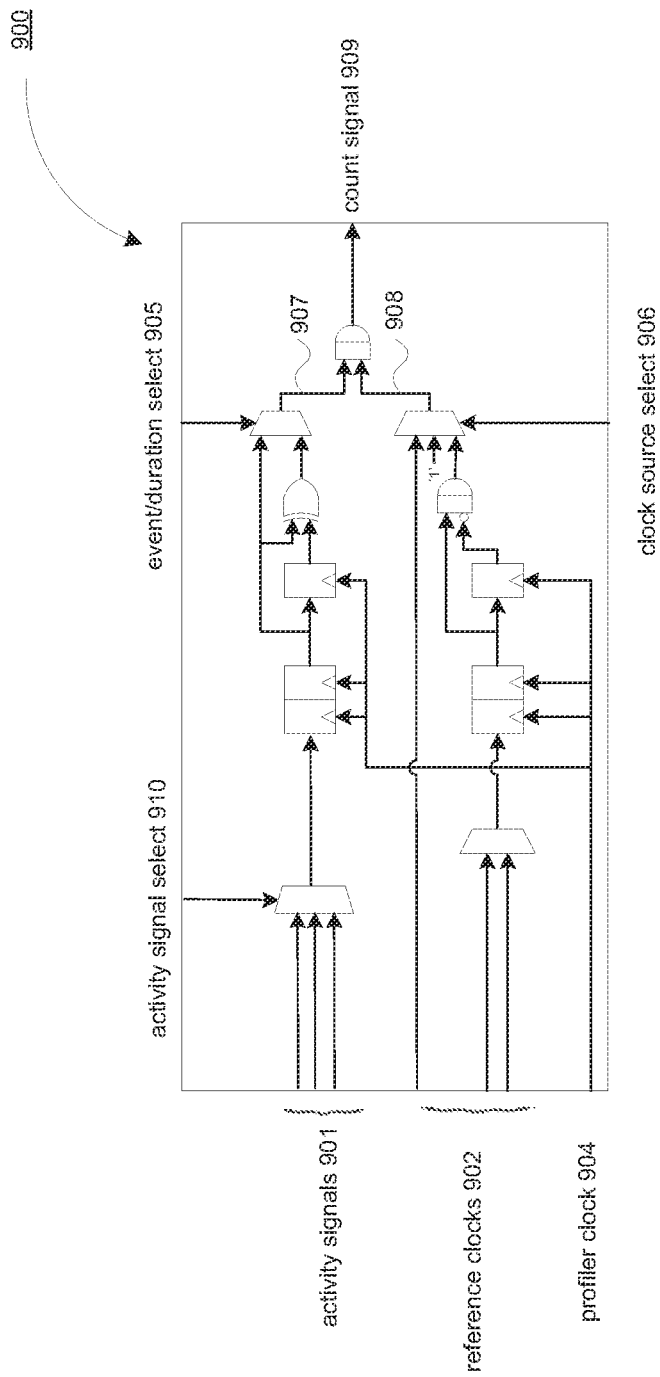
FIG. 9 illustrates an energy profiler unit sample logic according to an embodiment.

FIG. 9 illustrates an embodiment of sample logic 900 which may be implemented in energy profiler unit 800 to process activity and reference clock signals according to the techniques disclosed above. Among other components, the sample logic may comprise a plurality of multiplexers, synchronizing gates, and control logic. It is noted that various implementations and embodiments may use different components or combinations of components to perform the operations of the circuitry in FIG. 9. Thus the description that follows and the circuitry in FIG. 9 is to be regarded in an illustrative rather than a restrictive sense.

Sample logic 900 may be configured to receive a plurality of signals including activity signals 901 (indicating event or duration activities), reference clocks 902, profiler clock 904, and sample logic control signals including event/duration select 905, clock source select 906, and activity signal select 910. In an embodiment, activity signals 901 may be provided by a bus monitor, corresponding to event signal 609 in FIG. 6A and event signal 619 in FIG. 6B. In another embodiment, an activity signals 901 may be a pulse corresponding to a duration during which a component may be active.

Sample logic 900 may prepare activity signal 901 to be counted by the corresponding counter. Activity signal select 910 may select an activity signal to be counted. Activity signals 901 may be asynchronous signals that may be synchronized to profiler clock 904. Activity signals 901 may be edge-encoded signals upon which sample logic 900 may perform edge-detection. Event/duration select 905 may select as prepared event signal 907 a signal corresponding to an event, or a pulse signal corresponding to a duration.

Sample logic 900 may prepare the timing reference. The sample logic may select one of a plurality of reference clocks 902. The sample logic may synchronize a reference clock 902 with profiler clock 904. Clock source select 906 may select a prepared clock reference 908.

Sample logic 900 combines the prepared event signal 907 and the prepared clock reference 908 to provide a count signal 909, corresponding to count signal 818 in FIG. 8.

Returning to FIG. 8, energy profiler unit control register 804 may configured to receive signals to control energy profiler unit 800 including enabling/disabling and clearing counter unit 801. Energy profiler unit control register may provide control signals 820 to counter unit 801.

Counter unit configuration registers 805 may be configured to provide counter unit control signal 819 to configure a corresponding counter unit including event/duration select, event edge-encode select, and clock/clock divider select signals.

Interrupt registers 806 may be configured to receive interrupt signal 821 including counter overflow interrupt signals corresponding to counter unit. The interrupt registers may include INTR, INTR_SET, INTR_MASK, INTR- _MASKED, with one bit per counter. In an embodiment, each interrupt register includes 32 bits.

Counter read registers 807 may store the value of the corresponding counter and transfer the value to bus interface 810.

Upon receiving counter unit configuration signal 819, energy profiler unit control signals 820, and count signal 818, counter 803 may count events or duration. Once counter 803 is enabled, counter 803 will count the edges of profiler clock 811 during the period of time when the count signal 818 is of a given value (e.g., a "high" level), until the counter is disabled. Counter 803 may transfer the final counter value to counter read registers 807. Counter read registers 807 may transfer the final counter value to bus interface 810.

It is to be understood that energy profiler unit 800 may be implemented using different components or combinations of components to perform the methods as disclosed above. In an example, the final value of a counter may be directly transferred to bus interface 810. In another example, control signals may be provided directly to the counter unit without intervening registers. In another example, the components of energy profiler unit 800 may not be synchronized to profiler clock 811; in this example, additional synchronization circuitry may be required. In an embodiment, counter 803 may be configured to be a free running counter.

In an embodiment, a single energy profiler unit may be implemented in a microcontroller. In another embodiment, multiple energy profiler units of different configurations may be implemented in a microcontroller. In an example, an energy profiler unit may be implemented using a clock other than profiler clock 811 as a reference clock for the energy profiler unit.

In an embodiment, each event activity or duration activity to be counted may have a corresponding counter unit 801 within energy profiler unit 800. In another embodiment, event or duration activities may share a counter unit 801. In this embodiment, additional logic circuitry may be required to select the activity to be counted.

In an embodiment, energy estimating circuitry may comprise some or all of the elements of energy profiler unit 800 as illustrated in FIG. 8. In an embodiment, energy estimating circuitry may comprise some or all of the elements of sample logic 900 as illustrated in FIG. 9. Energy estimating circuitry may further comprise logic circuitry, including but not limited to a CPU, which may calculate event counts and to estimate energy consumption according to the methods described above and disclosed in FIG. 2.

Energy Profiler Results

In an embodiment, a microcontroller may comprise decision circuitry which may use a measurement of energy consumption estimated using the methods and apparatus described herein to dynamically adjust operational settings during runtime operation in order to manage power consumption. In an example, decision circuitry may enable/disable specific components or peripherals, or adjust the operational frequency of specific components, to limit peak power consumption or to limit average power consumption based on an estimated measure of energy consumption by the component. No external hardware may be required when the microcontroller uses the results during operation.

In an embodiment, an external system coupled to the microcontroller may include an indicator (e.g., a light or meter) or a display (e.g., a liquid crystal display), which may display information such as such as estimated battery-life, current power consumption, or energy consumption based on a measurement of power and energy consumption estimated using the methods and apparatus described herein.

In an embodiment, an external system coupled to the microcontroller include energy estimating circuitry to estimate energy consumption of components using the methods and apparatus described herein. In a specific embodiment, an external system may be a debugging environment for the microcontroller, for example, an Integrated Development Environment ("IDE") running on a host system (typically a PC). The microcontroller may be connected to the host system by a debug interface, for example, an ARM debug and trace port. The external system may include a meter coupled to the microcontroller to measure power consumption of the microcontroller during operation.

The external system may access components of the microcontroller including a bus monitor, a counter, or an energy profiler unit. In an example, the external system may retrieve information from the microcontroller including some or all of count, duration, energy coefficients, and measurement of energy consumption information. In an example, the external system may retrieve count, duration, and energy coefficients from the microcontroller. The external system may comprise energy estimating circuitry to use the count, duration, and energy coefficient information to estimate a measure of energy consumption of the components of the microcontroller and total energy consumption of the microcontroller. In another example, the external system may retrieve count and duration from the microcontroller and energy coefficients from the user of the external system. The external system may comprise energy estimating circuitry to use the count, duration, and energy coefficients information to estimate a measure of energy consumption of the components of the microcontroller and total energy consumption of the microcontroller. In another example, the external system may retrieve count and duration information from the microcontroller and measured power consumption from a meter. The user of the external system may use the count, duration, and measured power consumption information to estimate energy coefficients. In other embodiments, the debug software may access the energy consumption information estimated by the microcontroller.

An application software developer may use the energy consumption information to fine-tune the software to manage energy consumption, for example, to minimize peak energy consumption or to maximize battery lifetime.

Figure 10A:
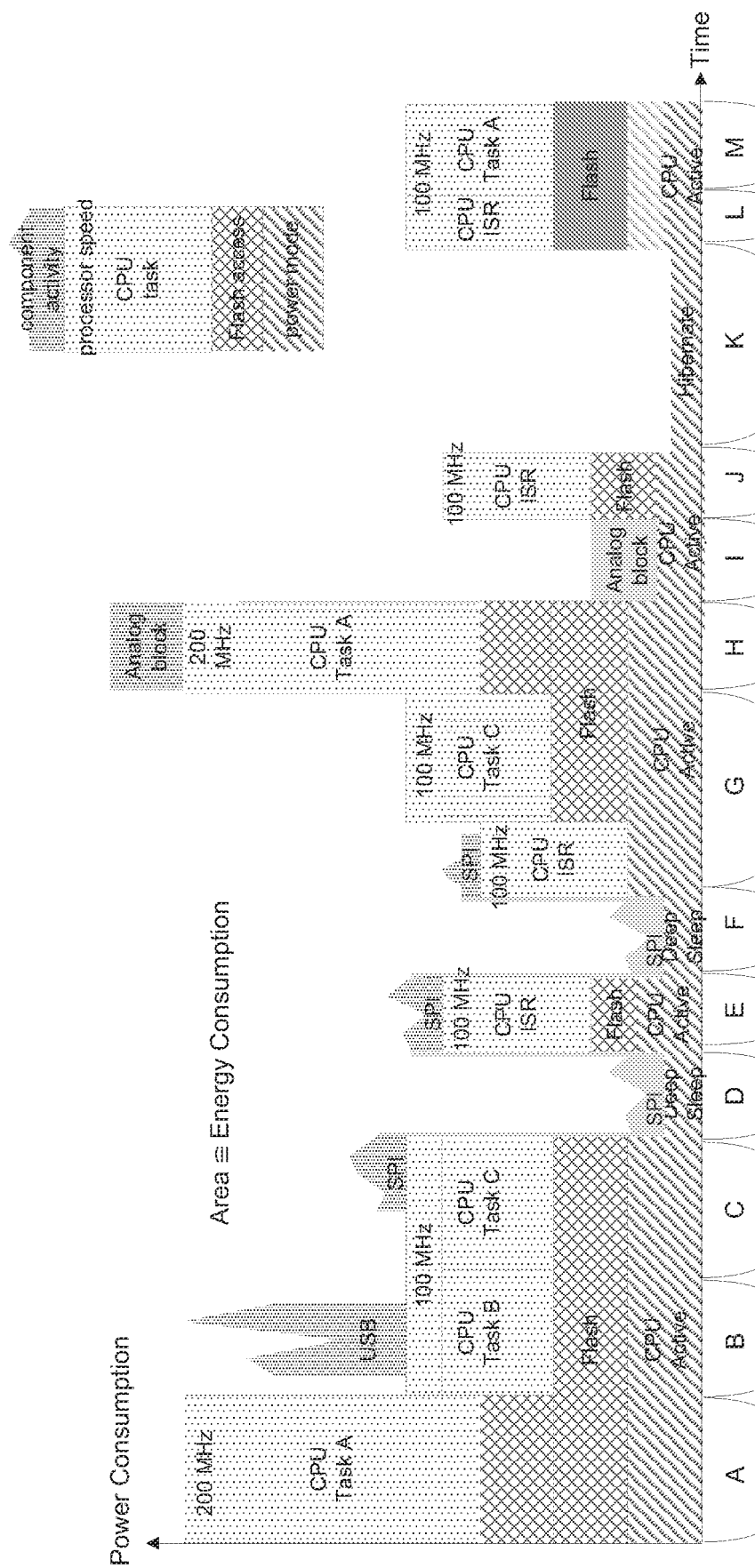
FIGS. 10A-B illustrate output displays of energy consumption according to various embodiments.
Figure 10B:
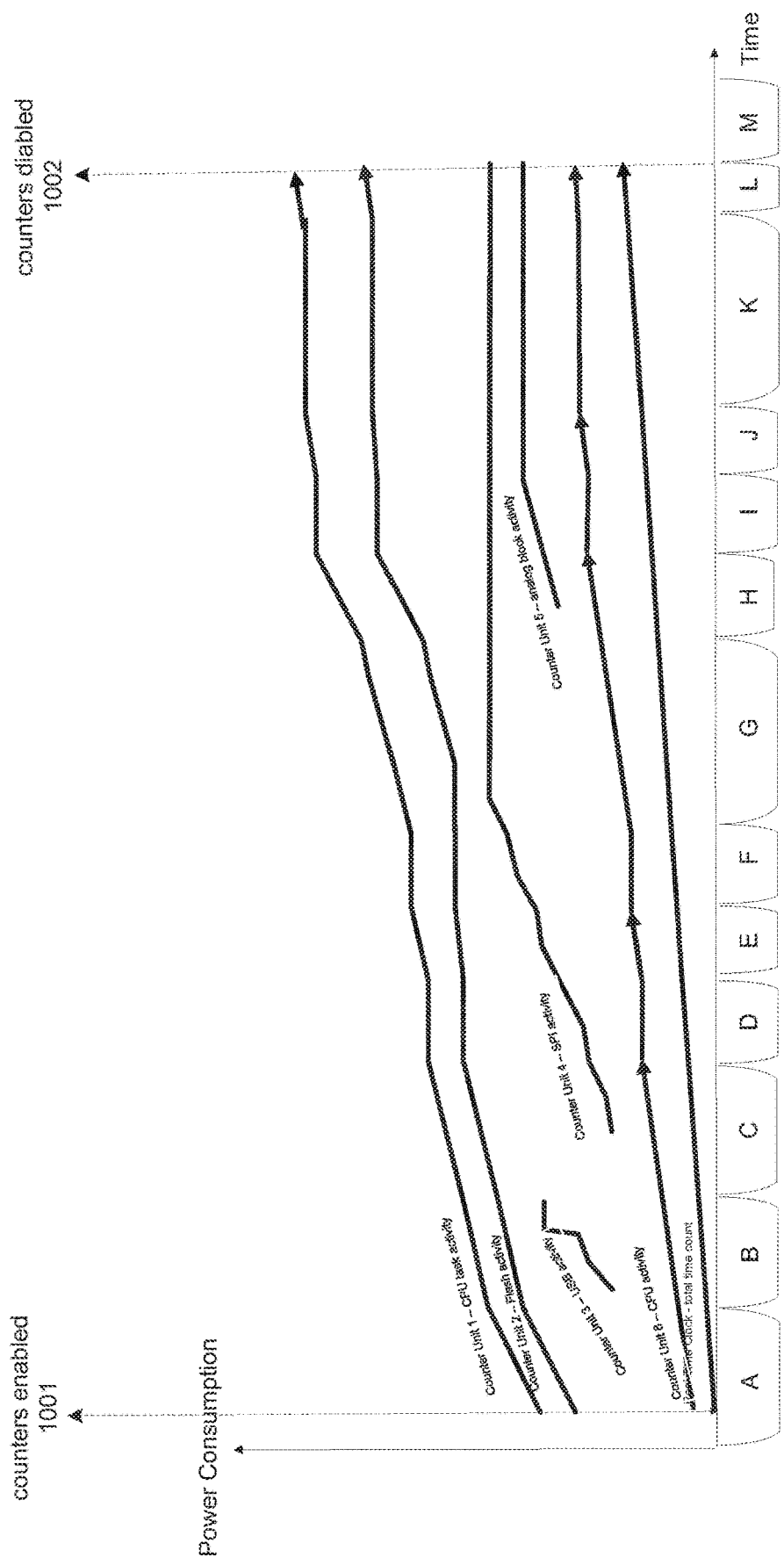

FIGS. 10A-10B illustrate two embodiments of visual results that may be produced by an external system as a result of the methods disclosed above. It is noted that the description that follows and the embodiments shown in FIGS. 10A-10B are to be regarded in an illustrative rather than a restrictive sense.

FIG. 10A illustrates a calculation of instantaneous power consumption as a function of time. Power consumption may be indicated by the vertical axis; time may be indicated on the horizontal axis. Power may be consumed by the CPU in different energy modes of the microcontroller, including active, deep sleep, and hibernate modes; by the CPU completing flash memory accesses; by the CPU completing tasks; and by components completing activities. As illustrated in the example of FIG. 10A, the CPU consumes more power in active mode (time periods A-C) than in deep sleep mode (time period D). The CPU consumes more power completing Task A while operating at 200 MHZ (time period A) than completing Task A while operating at 100 MHz (time period M). The peak power consumption occurs in time period H when the power mode is active, there are flash memory accesses, the CPU is completing Task A while operating at 200 MHZ, and an analog block is active.

FIG. 10B illustrates counter values corresponding to the activity illustrated in FIG. 10A. In an embodiment, counter unit 1 may be configured to count CPU activity, counter unit 2 may be configured to count Flash activity, counter 3 may be configured to count USB activity, counter unit 4 may be configured to count SPI activity, counter unit 5 may be configured to count analog block activity, and counter unit 6 may be configured to count CPU activity. As illustrated in FIG. 10B, the count value of counter unit 6 increases when the CPU is be operating in active mode (E.G., time periods A-C) but does not increase when the CPU is in deep sleep mode (time period D). The count value of counter unit 1 increases at a faster rate when the CPU is completing activities at 200 Mhz (time period A) than when the CPU is completing activities at 100 MHz (time period B). The count value of counter 1 does not increase when the CPU is not completing any activities (time period D).

In an embodiment, at time 1001 in FIG. 10B all of the counters are enabled and at time 1002 all of the counters are disabled. In another embodiment, the counters may be permanently enabled or disabled. In another embodiment, individual counters may be enabled or disabled independently of other counters.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. An integrated circuit (IC) device comprising:
a first component disposed within the IC device;
a second component disposed within the IC device; and
an energy estimating circuit disposed within the IC device, wherein the energy estimating circuit is configured to:
receive first activity signals indicative of first bus activities by the first component, wherein the first activity signals represent a number of event activities by the first component;
receive second activity signals indicative of second bus activities by the second component, wherein the second activity signals represent an amount of time the second component is active;
determine a first estimate of energy consumption by the first component based on the number and a first coefficient representing an average amount of energy consumed for a given event activity;
determine a second estimate of energy consumption by the second component based on the amount of time the second component is active and a second coefficient representing an average amount of energy consumed for a given duration activity; and
adjust an operational setting of the IC device based on the first estimate and the second estimate.

2. The IC device of claim 1, further comprising
a bus monitor coupled between a bus interface of the first component and the energy estimating circuit, wherein the bus monitor is configured to receive bus interface signals from the bus interface and provide the first activity signals to the energy estimating circuit.

3. The IC device of claim 2, wherein the bus monitor is configured to receive the bus interface signals from one of an Advanced High-Performance Bus (AHB) interface, an Advanced eXtensible Interface ("AXI"), and an x86-compatible bus interface.

4. The IC device of claim 1, further comprising
a first bus monitor coupled between a first bus interface of the first component and the energy estimating circuit, wherein the first bus monitor is configured to receive first bus interface signals from the first bus interface and to provide the first activity signals to the energy estimating circuit; and
a second bus monitor coupled between a second bus interface of the second component and the energy estimating circuit, wherein the second bus monitor is configured to receive second bus interface signals from the second bus interface and provide the second activity signals to the energy estimating circuit.

5. The IC device of claim 1, wherein the energy estimating circuit further comprises:
a first counter circuit configured to receive the first activity signals; and
a second counter circuit configured to receive the second activity signals.

6. An integrated circuit (IC) device comprising:
a first component disposed within the IC device;
a second component disposed within the IC device; and
an energy estimating circuit disposed within the IC device, wherein the energy estimating circuit is configured to:
receive first activity signals indicative of first bus transfer events by the first component, wherein the first activity signals comprise at least one of data transfer signals, event signals, or duration activity signals, wherein the duration activity signals indicate a first active time during which the first component executes a first duration activity;
receive second activity signals indicative of second bus transfer events by the second component;
determine a first estimate of energy consumption by the first component based on the first activity signals;

determine a second estimate of energy consumption by the second component based on the second activity signals; and adjust an operational setting of the IC device based on the first estimate and the second estimate, and wherein, to determine the first estimate of energy consumption, the energy estimating circuit is further configured to:

determine a first measure of energy consumption by the first component based on a first number of data transfers and a first energy coefficient, wherein the first energy coefficient corresponds to an amount of energy consumed associated with one data transfer;

determine a first number of events executed based on the event signals;

determine a second measure of energy consumption of the first component based on the first number of events and a second energy coefficient, wherein the second energy coefficient corresponds to an amount of energy associated with one of the events;

determine a first duration of the first active time based on the first duration activity;

determine a third measure of energy consumption of the first component based on the first duration and a third energy coefficient, wherein the third energy coefficient corresponds to an amount of power associated with the first duration activity; and determine the first estimate of energy consumption based on the first measure of energy consumption, the second measure of energy consumption, and the third measure of energy consumption.

7. The IC device of claim 6, wherein the energy estimating circuit further comprises a first counter circuit configured to receive the data transfer signals, a second counter circuit configured to receive the event signals, and a third counter circuit configured to receive the duration activity signals.

8. The IC device of claim 6, wherein the energy estimating circuit is further configured to receive the data transfer signals, determine the first measure of energy consumption, and store the first measure of energy consumption during runtime operation.

9. The IC device of claim 6, wherein one or more components of the IC device are configured to adjust operational settings during runtime operation based on the first measure of energy consumption.

10. The IC device of claim 6, wherein the first energy coefficient further corresponds to a first operating condition.

11. An apparatus comprising:

a microcontroller comprising an energy estimating circuit, a first component, and a second component, wherein the energy estimating circuit is configured to:

receive first activity signals indicative of first bus activities by the first component;

receive second activity signals indicative of second bus activities by the second component;

determine a first data transfer count indicating a first number of data transfers based on the first activity signals;

determine an amount of time the second component is active based on the second activity signals; and an external system coupled to the microcontroller, wherein the external system is configured to:

receive the first data transfer count and the amount of time the second component is active;

determine a first estimate of energy consumption by the first component based on the first number of data transfers and a first coefficient representing an average amount of energy consumed for a given data transfer;

determine a second estimate of energy consumption by the second component based on the amount of time the second component is active and a second coefficient representing an average amount of energy consumed for a given duration activity; and adjust an operational setting of the microcontroller based on the first estimate and the second estimate.

12. The apparatus of claim 11, wherein the microcontroller further comprises a third component, wherein the external system is configured to:

receive a number of event activities by the third component; and determine a third estimate of energy consumption by the third component based on the number of event activities and a third coefficient representing an average amount of energy consumed by a given event activity.

13. The apparatus of claim 11, wherein the external system is a debug environment running on a host system.

14. The apparatus of claim 11, wherein the energy estimating circuit is further configured to:

determine a first measure of energy consumption of the first component based on the first estimate of energy consumption, store the first measure of energy consumption, and wherein the external system is configured to access the first measure of energy consumption.

15. The apparatus of claim 11, wherein the microcontroller further comprises a bus monitor coupled between a bus interface of the first component and the energy estimating circuit, wherein the bus monitor is configured to receive bus interface signals from the bus interface and to provide the first activity signals to the energy estimating circuit.

16. An apparatus comprising:

a microcontroller comprising an energy estimating circuit, a first component, and a second component, wherein the energy estimating circuit is configured to:

receive first activity signals indicative of first bus transfer events by the first component, wherein the first activity signals comprise at least one of data transfer signals, event signals, or duration activity signals;

receive second activity signals indicative of second bus transfer events by the second component;

determine a first data transfer count indicating a first number of data transfers based on the first activity signals;

determine a second data transfer count indicating a second number of data transfers based on the second activity signals; and an external system coupled to the microcontroller, wherein the external system is configured to:

receive the first data transfer count and the second data transfer count;

determine a first estimate of energy consumption by the first component based on the first number of data transfers; and determine a second estimate of energy consumption by the second component based on the second number of data transfers, wherein:

the energy estimating circuit is further configured to:
receive the event signals of the first component;
determine a first number of events executed based on the event signals;
provide the first data transfer count indicating the first number of events executed to the external system;
receive duration activity signals indicating a first active time during which the first component executes a first duration activity;
determine a first duration of the first active time based on the duration activity signals; and
provide duration signals indicating the first duration to the external system; and the external system is further configured to:
receive the first data transfer count and determine a second measure of energy consumption of the first component based on the first data transfer count and a second energy coefficient, wherein the second energy coefficient corresponds to an amount of energy associated with one of the events;
receive the duration signals and determine a third measure of energy consumption of the first component based on the duration signals and a third energy coefficient, wherein the third energy coefficient corresponds to an amount of power associated with the first duration activity; and
determine the first estimate of energy consumption based on at least the second measure of energy consumption and the third measure of energy consumption.

17. A method of determining an energy consumption of components of an integrated circuit (IC) device, the method comprising:

receiving, by an energy estimating circuit, first activity signals indicative of first bus activities by a first component of the IC device, wherein the first activity signals represent a number of event activities by the first component;

receiving, by the energy estimating circuit, second activity signals indicative of second bus activities by a second component of the IC device, wherein the second activity signals represent an amount of time the second component is active;

determining, by the energy estimating circuit, a first estimate of energy consumption by the first component based on the number and a first coefficient representing an average amount of energy consumed for a given event activity;

determining, by the energy estimating circuit, a second estimate of energy consumption by the second component based on the amount of time the second component is active and a second coefficient representing an average amount of energy consumed for a given duration activity; and adjust an operational setting of the IC device based on the first estimate and the second estimate.

18. The method of claim 17, further comprising:
receiving, by a bus monitor, a plurality of data signals from a bus interface of the first component, the plurality of data signals indicating data transfers executed at the bus interface; and
providing, by the bus monitor, the first activity signals based on the plurality of data signals.

19. The method of claim 17, wherein the energy estimating circuitry are components of the IC device and wherein the receiving, determining, and providing are performed during runtime operation.

20. The method of claim 19, further comprising adjusting operational settings of the IC device during runtime operation based on the first estimate of energy consumption or the second estimate of energy consumption.

21. The IC device of claim 1, wherein the number of event activities are data transfers, and wherein the first coefficient represents an average amount of energy consumed for a given data transfer.

22. The IC device of claim 1, wherein the number of event activities are activities enabled or disabled by firmware or software.

23. The IC device of claim 1, wherein the number of event activities are activities under hardware control.

* * * * *